(12) United States Patent
Arai et al.

(10) Patent No.: US 6,384,881 B1
(45) Date of Patent: May 7, 2002

(54) SURFACE LIGHT SOURCE DEVICE OF SIDE LIGHT TYPE AND LIQUID CRYSTAL DISPLAY

(75) Inventors: Takayuki Arai, Kasukabe; Shingo Ohkawa, Koshigaya, both of (JP)

(73) Assignees: Enplas Corporation, Kawaguchi; Yasuhiro Koike, Yokohama, both of (JP)

( * ) Notice: Subject to any disclaimer, the term of this patent is extended or adjusted under 35 U.S.C. 154(b) by 0 days.

(21) Appl. No.: 09/184,583

(22) Filed: Nov. 3, 1998

(30) Foreign Application Priority Data

Nov. 5, 1997 (JP) .............................................. 9-319084

(51) Int. Cl.$^7$ ....................... G02F 1/1335; G01D 11/28; F21V 7/04
(52) U.S. Cl. .............................. 349/65; 349/61; 362/26; 362/27; 362/31
(58) Field of Search .............................. 362/26, 27, 31; 349/65, 61

(56) References Cited

U.S. PATENT DOCUMENTS

| | | | | |
|---|---|---|---|---|
| 5,341,231 A | * | 8/1994 | Yamamoto et al. | 349/63 |
| 5,420,761 A | * | 5/1995 | DuNah et al. | 362/31 |
| 5,727,107 A | * | 3/1998 | Umemoto et al. | 385/116 |
| 5,779,337 A | * | 7/1998 | Saito et al. | 362/31 |
| 5,887,964 A | * | 3/1999 | Higuchi et al. | 349/65 |
| 5,926,033 A | * | 7/1999 | Saigo et al. | 362/31 |
| 5,980,054 A | * | 11/1999 | Fukui et al. | 362/31 |
| 5,997,148 A | * | 12/1999 | Ohkawa | 362/31 |

* cited by examiner

Primary Examiner—William L. Sikes
Assistant Examiner—Tarifur R. Chowdhury
(74) Attorney, Agent, or Firm—Staas & Halsey LLP

(57) ABSTRACT

A liquid crystal display including includes a surface light source device of side light type for backlighting a liquid crystal panel. A primary light source supplies light to a guide plate. Emission from an emitting face impinges on a polarization separating element through a prism sheet. A polarization component which is directionally corresponding to a transmission polarization plane M12 is supplied to the liquid crystal panel. Reflection at the polarization separating element provides returning light which is subject to inside reflection by projection rows formed on a back face of the guide plate, thereby causing the guide plate to emit afresh recycling light. This recycling light, which is rich with the polarization component directionally in accordance with transmission polarization plane M12, impinges again on the polarization separating element. The projection rows formed on the back face run in a direction (first direction) which is generally vertical with respect to an incidence face of the guide plate while obliquely crossing with respect to both reflection polarization plane M2 and transmission polarization plane M12 of the polarization separating element. Projection rows formed on an inner face of the prism sheet run in another direction (second direction) which is generally parallel with respect to the incidence face of the guide plate. The polarization separating element and the prism sheet may be unified.

13 Claims, 18 Drawing Sheets

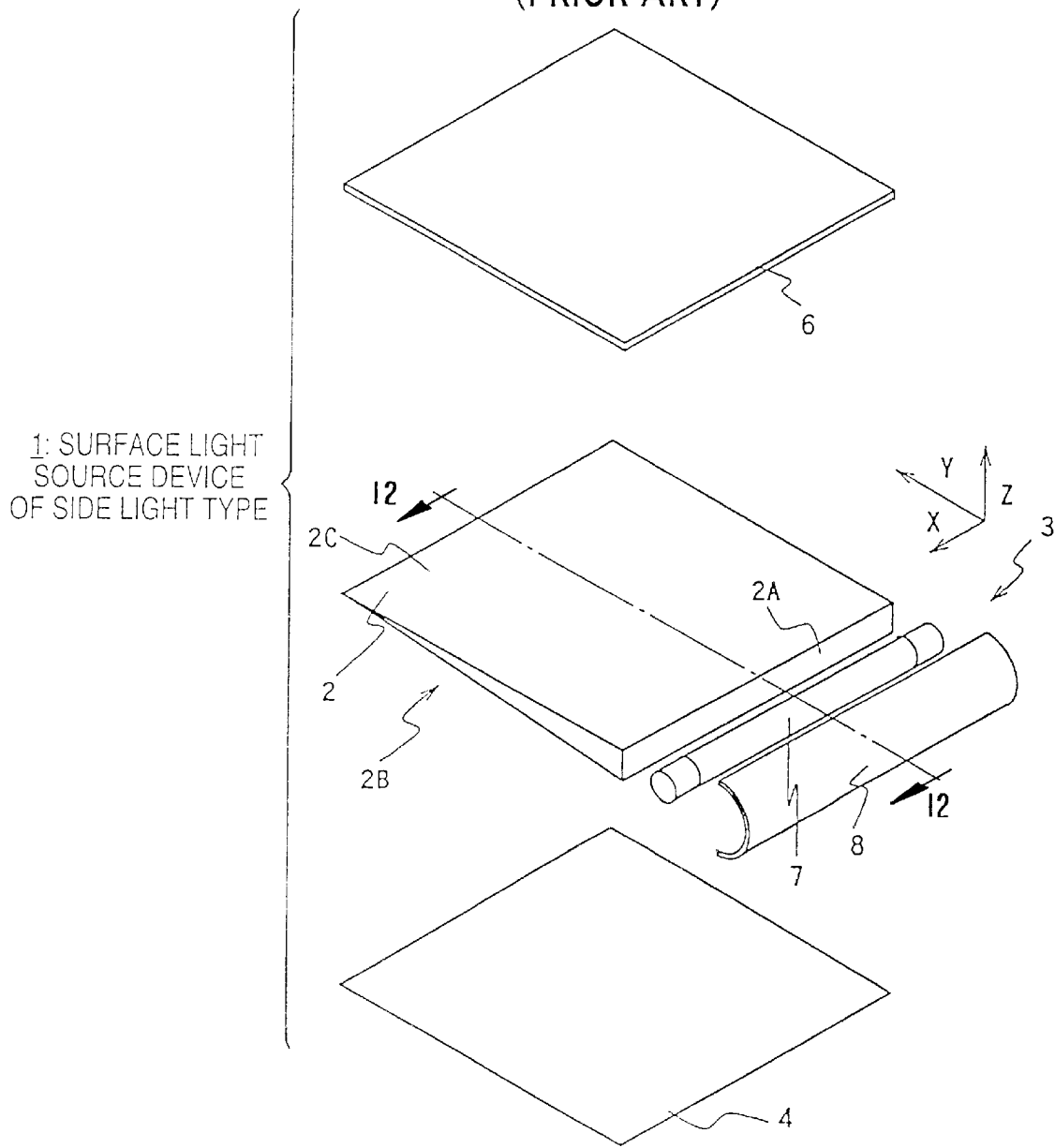

SURFACE LIGHT SOURCE DEVICE OF SIDE LIGHT TYPE AND LIQUID CRYSTAL DISPLAY

BACKGROUND

1. Field of Invention

The present invention relates to a surface light source device of side light type and a liquid crystal display employing the surface light source device in its backlighting arrangement. For instance, the present invention relates to a liquid crystal display provided with a liquid crystal display panel employing TN liquid crystal.

2. Related Art

Surface light source devices of side light type have been conventionally employed, for instance, to illuminate a liquid crystal display panel from its back. This arrangement is suitable for making the overall structure thin.

In general, the light source device of side light type comprises a rod-shaped light source such as a cold cathode tube as a primary light source, which is arranged beside a guide plate (i.e. plate-shaped light guide). The primary light source emits illumination light which is introduced into the guide plate through a side end face (i.e. incidence face) thereof. Such introduced light propagates inside of the guide plate while outputting emission from a major face (i.e. emission face) toward a liquid crystal display panel.

Known types of guide plates employable in light source devices of side light type are, one having a substantially uniform thickness and another having a tendency to reduce thickness according to distance from the primary light source. The latter provides emission, in general, more effectively in comparison with the former. Light scattering-and-guiding material or transparent resin is employed as a material of these guide plates.

A guide plate made of light scattering-and-guiding material is called a "scattering guide plate". A scattering guide plate is composed of a matrix, such as PMMA (polymethlyl methacrylate), and a great number of light-permeable fine particles which are dispersed uniformly therein. The fine particles are different from the matrix in refractive index.

FIG. 11 is an exploded perspective view illustrating a conventional light source device of side light type which employs a guide plate of the latter sort. FIG. 12 is a cross section along line 12—12 in FIG. 11.

Referring to FIG. 11 and FIG. 12, a light source device of side light type 1 comprises a guide plate 2, a primary light source 3, a reflection sheet 4 and a prism sheet 6 which is functioning as a light control member. The reflection sheet 4, guide plate 2 and prism sheet 6 are laminatedly arranged. The primary light source 3 is disposed beside the guide plate 2.

The guide plate 2 is made of a scattering-and-guiding material with a wedge-shaped cross section, being called a scattering guide plate. The scattering-and-guiding material is composed of a matrix, such as PMMA (polymethyl methacrylate), and a great number of light-permeable fine particles which are dispersed uniformly therein. The fine particles are different from the matrix in refractive index.

The primary light source 3 includes a cold cathode tube (fluorescent lamp) 7 backed by a reflector 8 which is generally semi-circular in cross section. Illumination light is supplied to a side end face, an incidence face 2A, of the scattering guide plate 2 through an opening of the reflector 8. The reflection sheet 4 is a sheet-like member with regular reflectivity such as metal foil or with irregular reflectivity such as white PET film.

Illumination light L is introduced into the guide plate 2 through the incidence face 2A and propagates toward a distal end while repeating reflections at two major faces (back face 2B and emission face 2C). Illumination light is therewith subject to scattering effect of the fine particles within the guide plate 2. If the reflection sheet 4 is an irregular reflection member, there will be an added irregular reflection effect.

Repeated reflections by the inclined back face 2B will give the illumination light reducing incidence angles with respect to the emission face 2C. Such reduction in incidence angle brings increased components which are angularly smaller than the critical angle with respect to the emission face 2C, thereby promoting emission from the emission face. This prevents emission intensity from being insufficient in an area distant from the primary light source 3.

The emission face 2C outputs illumination light which assumes scattering light because it has undergone scattering effect of the fine particles within the guide plate 2 and, in some cases, further has undergone irregular reflection effect of the reflection sheet 4.

However, illumination light outputted from the emission face 2C has a principal propagation direction inclined toward the distal end with respect to the frontal direction in a plane perpendicular to the incidence face 2A (i.e. inclined toward a direction as distancing the incidence face 2A). That is, the output light of the scattering guide plate 2 has directivity. This property is called "emission directivity".

The prism sheet 6 disposed along the emission face 2C is a light-permeable sheet made of, for instance, polycarbonate. The prism sheet 6 is provided with a prismatic surface including a great number of parallel prismatic rows. In the illustrated example, the prism sheet 6 is arranged in an orientation such that the prismatic surface is directed toward the guide plate 2 and the prismatic rows run generally parallel (within an angular range about 0 to 15 degrees) to the incidence face 2A.

Each prismatic row is a fine projection row such as one having a triangular cross section. Slopes of the projections correct obliquely emitted light toward the frontal direction in a plane perpendicular to the incidence face 2A.

A double-surfaces prism sheet with prismatic surfaces on both faces may be employed. In the case, prismatic rows on its outer face run generally at right angles with ones on its inner face. The prismatic rows on the outer face correct light angularly toward the frontal direction in a plane parallel to the incidence face 2A.

FIG. 13 is an exploded perspective view illustrating another conventional light source device of side light type. FIG. 14 is a cross section along line 14—14 in FIG. 13. In this example, a transparent guide plate is employed.

Referring to FIG. 13 and FIG. 14, a light source device of side light type 10 comprises a guide plate 12, a primary light source 3, a reflection sheet 4, a light diffusion sheet 13 and prism sheets 14, 15. The reflection sheet 4, guide plate 12, light diffusion sheet 13 and prism sheets 14, 15 are laminatedly arranged.

The guide plate 12 is made of a molded body of transparent acrylic resin, having a wedge-shaped cross section. The guide plate 12 has major faces to provide a back face 12B and an emission face 12C. A great number of dot-like light diffusion elements form a pattern on the back face 12B, thereby providing a light diffusible surface. In order to achieve uniform brightness, the dot pattern is formed so that diffusing power rises according to distance from an incidence face 12A. For instance, a covering rate of the dot pattern is adjusted so as to increase according to distance from the incidence face 12A.

The primary light source 3 and the reflector 4 are the same as those shown in FIGS. 11 and 12. Illumination light L emitted from the primary light source 3 is introduced into the guide plate 12 through the incidence face 12A. Such introduced light L propagates toward a distal end while repeating reflections at the back face 12B, along which the reflector is disposed, and the emission face 2C. On the way, illumination light L is subject to scattering effect of the back face 12B which is provided with diffusibility. If the employed reflection sheet 4 has irregular reflectivity, irregular reflection will be effected.

Repeated reflections by the inclined back face 12B will give the illumination light reducing incidence angles with respect to the emission face 12C. Such reduction in incidence angle brings increased components which are angularly smaller than the critical angle with respect to the emission face 2C, thereby promoting emission from the emission face. This prevents emission intensity from being insufficient in an area distant from the primary light source 3. Illumination light outputted from the emission face 12C has scattering property as well as directivity similar to that in the case shown in FIGS. 11 and 12. The prism sheets 5, 6 are arranged to correct emission directivity of the guide plate 12.

The light diffusion sheet 13 diffuses weakly illumination light emitted from the guide plate 12, thereby preventing the diffusible surface on the back face 12B from being seen through. If such prevention is not supplied the diffusible surface will be observed from above the emission face 12C, causing reduction in illumination light quality.

The prism sheets 5, 6 are light-permeable sheets made of, for instance, polycarbonate. Prismatic surfaces including a great number of projections are formed on faces which are opposite with the guide plate 12 (i.e. on outer faces).

Each projection consists of a pair of slopes forming an isosceles triangular cross section. The prism sheet 14 is orientated so that projections on its prismatic surface run generally in line (within an angular range from 0 to about 15 degrees) with the incidence face 12A. On the other hand, the prism sheet 15 is orientated so that projections on its prismatic surface run generally at right angles (within an angular range of 90±about 15 degrees) with respect to the incidence face 12A.

Main propagation direction of the light outputted from the emission face 12C is corrected by the prism sheet 14 toward the frontal direction in a plane perpendicular to the incidence face 12A. And then the prism sheet 15 gathers angularly the illumination light toward the frontal direction in a plane parallel to the incidence face 12A. A double-surfaces prism sheet with prismatic surfaces on both faces may be employed. The surface light source device as described in this example is also capable of outputting generally uniform emission toward the frontal direction as well as the previously described prior art device (as shown in FIGS. 11, 12).

If a surface light source device as described above is applied to backlighting arrangement for LCD, a liquid crystal display panel is disposed outside of the prism sheet 6 (FIG. 11) or prism sheet 15 (FIG. 13). Backlighting of the liquid crystal display panel is effected through a polarizer arranged on a back face of the liquid crystal cell. As broadly known, the polarizer transmits selectively a polarization component which accords directionally with its polarization plane. Such a polarization plane of a polarizer as employed in a liquid crystal display panel is called "transmission polarization plane of liquid crystal display panel".

Illumination light from a surface light source of above-described sorts contain polarization components of all directions. Every polarization component which does not match the transmission polarization plane is almost absorbed and this leads to useless consumption. As a result, a bright display with low electric power is hardly realized.

To avoid this, it has been proposed to put a polarization separating element before the polarizer. The polarization separating element is an element, for example, consisting of a multilayer film made of optical anisotropy materials which have different refractive indexes for an ordinary ray and an extraordinary ray. It has a function such that a polarization component directionally according to its polarization plane is transmitted while polarization component directionally different from its a polarization plane is almost reflected. Such polarization plane set at the polarization separating element is called "transmission polarization plane of polarization separating element". And a plane perpendicular to this is called "reflection polarization plane".

Thus a reflected component provides "returning light" which travels toward the guide plate. Such returning light is converted into light like natural light via return to the guide plate, re-emission therefrom and other various routes, being subject to recyclic use. Such recycle light impinges the polarization separating element again and a remarkable portion (for instance, more than about a half) of this incident light transmits through the polarization separating element. Accordingly, if the polarization separating element and the liquid crystal display panel are orientated so that their transmission polarization planes accord with each other, backlighting efficiency is improved.

This will be understood by referring to FIGS. 15 and 16. FIG. 15 is a graph illustrating directional luminance characteristics (measurement result) of an arrangement in which a liquid crystal display panel (polarizer) is backed by the surface light source device 10 as shown in FIG. 13 (without a polarization separating element). In the graph, luminance indication is normalized so that luminance of the vertical direction with respect to the emission face 12C is indicated by the standard value "1". A white PET sheet was employed as the reflection sheet 4.

On the other hand, FIG. 16 is a graph illustrating directional luminance characteristics (measurement result) of an arrangement in which a polarization separating element is interposed between the liquid crystal display panel (polarizer) and the surface light source device 10. Luminance curves are plotted according to the normalization adopted in FIG. 15. Comparing FIG. 16 with FIG. 15, luminance of vertical direction with respect to the emission face 12C is increased by a factor of 1.247, which is due to the interposed polarization separating element.

A similar comparison was performed also for cases where the surface light source device 1 shown in FIG. 11 was employed for backlighting. Results are shown in FIGS. 17 and 18.

FIG. 17 is a graph illustrating directional luminance characteristics (measurement result) of an arrangement in which a liquid crystal display panel (polarizer) is backed by the surface light source device 1 (without a polarization separating element). On the other hand, FIG. 18 is a graph illustrating directional luminance characteristics (measurement result) of an arrangement in which a polarization separating element is interposed between the liquid crystal display panel (polarizer) and the surface light source device 1.

Luminance curves in these (FIGS. 17 and 18) are plotted according to the normalization adopted in FIG. 15. Comparing FIG. 17 with FIG. 15, luminance of the frontal direction is reduced by a factor of 0.705. Such reduction is supposedly due to absence of prism sheet to gather light in a plane parallel to the incidence face 2A. Nevertheless, as understood from FIG. 18, the interposed polarization separating element increases luminance of the frontal direction to 1.001 times that of FIG. 15.

From the above-demonstrated results, there is no doubt that employment of a polarization separating provides improvement in luminance of an LCD (i.e. improvement in displaying luminance). However, room for further improvement in luminance yet remains for the following reasons.

As described above, luminance improvement effect of the polarization separating element is dependent on a phenomenon that components discording to the transmission polarization plane are after reflection, directed to recycle use via various routes. Roughly estimated, if this recycle process is perfect (i.e. involving no loss) total emission from the liquid crystal display panel is expected to be doubled due to the polarization separating element.

To see this, integration of luminance depending on directions was calculated for the cases of FIG. 15 and FIG. 16, respectively. The calculation told that luminance improvement due to the polarization separating element was a factor of 1.577. According to similar calculations for comparing the case of FIG. 17 and FIG. 18, luminance improvement due to the polarization separating element was a factor of 1.578.

From such results, it is understood that room for further increase in recycle efficiency of components reflected by the polarization separating element (i.e. returning light) remains yet. Such further increases in recycle efficiency would provide improvement in displaying brightness of the LCD.

OBJECT AND SUMMARY OF INVENTION

The present invention is proposed under the above-described background. An object of the present invention is to provide a novel surface light source device of side light type which is capable of increasing emission from a liquid crystal display panel strikingly compared with prior art surface light source devices provided with an arrangement including a polarization separating element.

Another object of the present invention is to provide a liquid crystal display which is improved in displaying brightness due to said novel surface light source device of side light type. The present invention is applied to a surface light source device of side light type which comprises a guide plate having two major faces to provide an emission face and a back face, a primary light source for supplying illumination light to a side end face of the guide plate and a polarization separating element arranged in a light path of emission from the emission face.

The polarization separating element has a function to transmit polarization components directionally corresponding to a transmission polarization plane while reflecting polarization components directionally corresponding to a reflection polarization plane which is perpendicular to the transmission polarization plane. The back face of the guide plate is provided with a great number of projection rows which run parallel with each other and in a first direction.

According to a feature of the present invention, the first direction is neither corresponding to the transmission polarization plane nor vertical with respect to the transmission polarization plane. In a preferable embodiment, the first direction gives an approximate bisect of an angle between the transmission polarization plane and the reflection polarization plane. The first direction may be generally vertical with respect to the side end face.

A light control member may be interposed between the emission face and the polarization separating element. In this case, the light control member is provided with a great number of projection rows which run parallel with each other and in a second direction vertical with respect to the first direction. The polarization separating element and the light control member may be unified into one member.

Individual projection rows on the back face of the guide plate may include a pair of slopes. Each pair of slopes preferably give an angle within a range from 50 to 130 degrees. Individual projection rows of the light control member may also include a pair of slopes. Each pair of slopes preferably give an angle within a range from 30 to 70 degrees. A reflection surface is arranged along the back face of the guide plate.

To apply a surface light source device as above-described to a liquid crystal display, a liquid crystal display panel may be backed by the light source device as to be supplied with illumination light through a polarizer. In this case, the polarizer is set on an incidence side of the liquid crystal display panel so that the polarizer and the polarization separating element have transmission polarization planes, respectively, which correspond directionally to each other.

Features of the present invention enable reflection at the polarization separating element to provide returning light which is subject to inside reflection by the projection rows formed on the back face of the guide plate, thereby causing the guide plate to emit afresh recycling light. This recycling light, is rich with the polarization component directionally corresponding to the transmission polarization plane of the polarization separating element. Accordingly, the illumination light supply to the liquid crystal display panel will involve low loss, leading to improvement in displaying brightness.

More details and features of the present invention will be understood by the following description with references to the drawings in which:

BRIEF DESCRIPTION OF DRAWINGS

FIG. 11 is an exploded perspective view illustrating a conventional surface light source device of side light type;

EMBODIMENTS

(1) First Embodiment

Figure 1A:
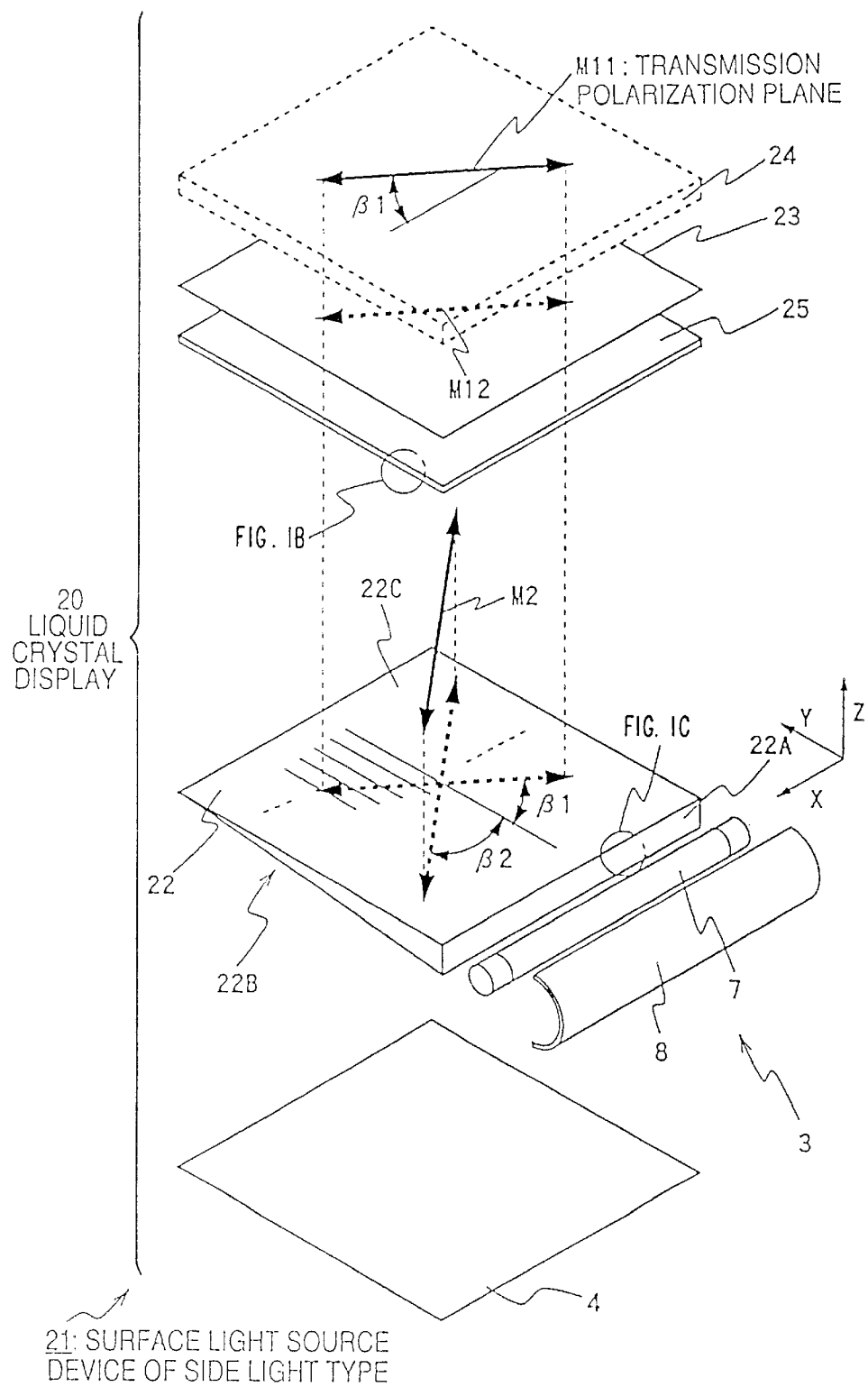
FIG. 1A is an exploded perspective view illustrating an LCD in accordance with the first embodiment of the present invention.

Referring to FIG. 1A, a liquid crystal display of the first embodiment in accordance with the present invention is illustrated comparatively with FIG. 11. Elements common to FIG. 11 are directed by common reference symbols and repeated descriptions of the common elements are simplified.

The liquid crystal display 20 includes a liquid crystal display panel 24 and a surface light source device 21 for backlighting. The surface light source device 21 comprises a primary light source 3, a reflection sheet 4, a scattering guide plate 22, a prism sheet 25, which is functioning as a light control member, and a polarization separating element 23. The reflection sheet 4, the scattering guide plate 22, the prism sheet 25 and the polarization separating element 23 are laminatedly arranged.

The primary light source 3 is disposed along a side end face (incidence face) 22A of the scattering guide plate 22. The scattering guide plate 22 includes a back face 22B and an emission face 22C as two major faces. The reflection sheet 4 is made of, for example, a white PET sheet and reflects light, which leaks out of the scattering guide plate 22, toward the guide plate 22 effectively.

Illumination light L emitted from the fluorescent lamp 7 is led into the scattering guide plate 22 through the incidence face 22A directly or after reflection by a reflector 8. Thus, introduced illumination light propagates inside of the scattering guide plate 22 while repeating reflections at back face 22B and emission face 22C. As reflections by the back face 22B are repeated, illumination light reduces incidence angles with respect to the emission face 22C.

Light components angularly smaller than the critical angle with respect to the emission face 22C are emitted from the emission face 22C. Loss of light due to leaking through the back face 22B is prevented by the reflection sheet 4 which reflects and returns such leaking light into the scattering guide plate 22 effectively.

Figure 10A:
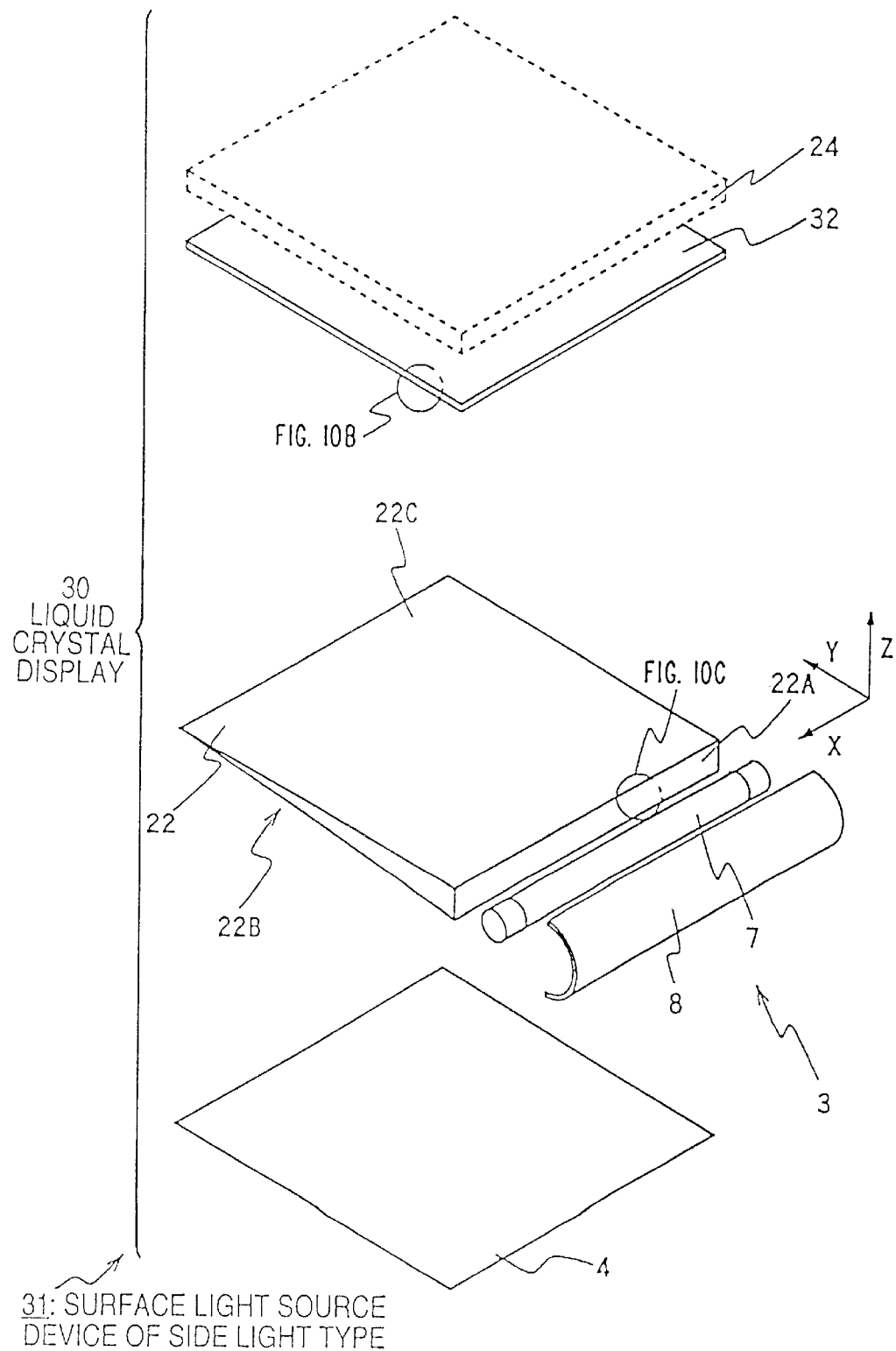
FIG. 10A is an exploded perspective view illustrating an LCD in accordance with the second embodiment of the present invention.
Figure 10B:
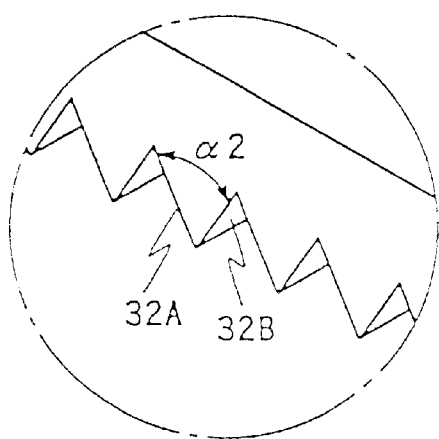
FIG. 10B is a an enlarged view of a side of composite function element 32 shown in FIG. 10A.
Figure 10C:
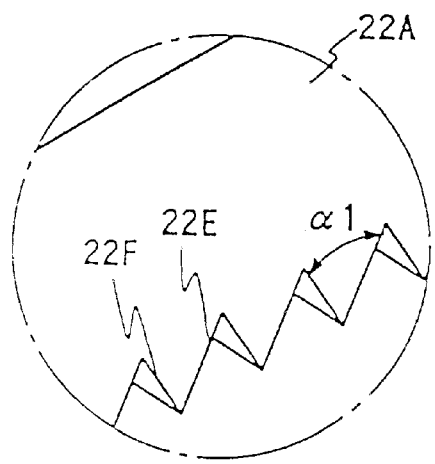
FIG. 10C is an enlarged view of a side end face of guide plate 22 shown in FIG. 10A.
Figure 12:
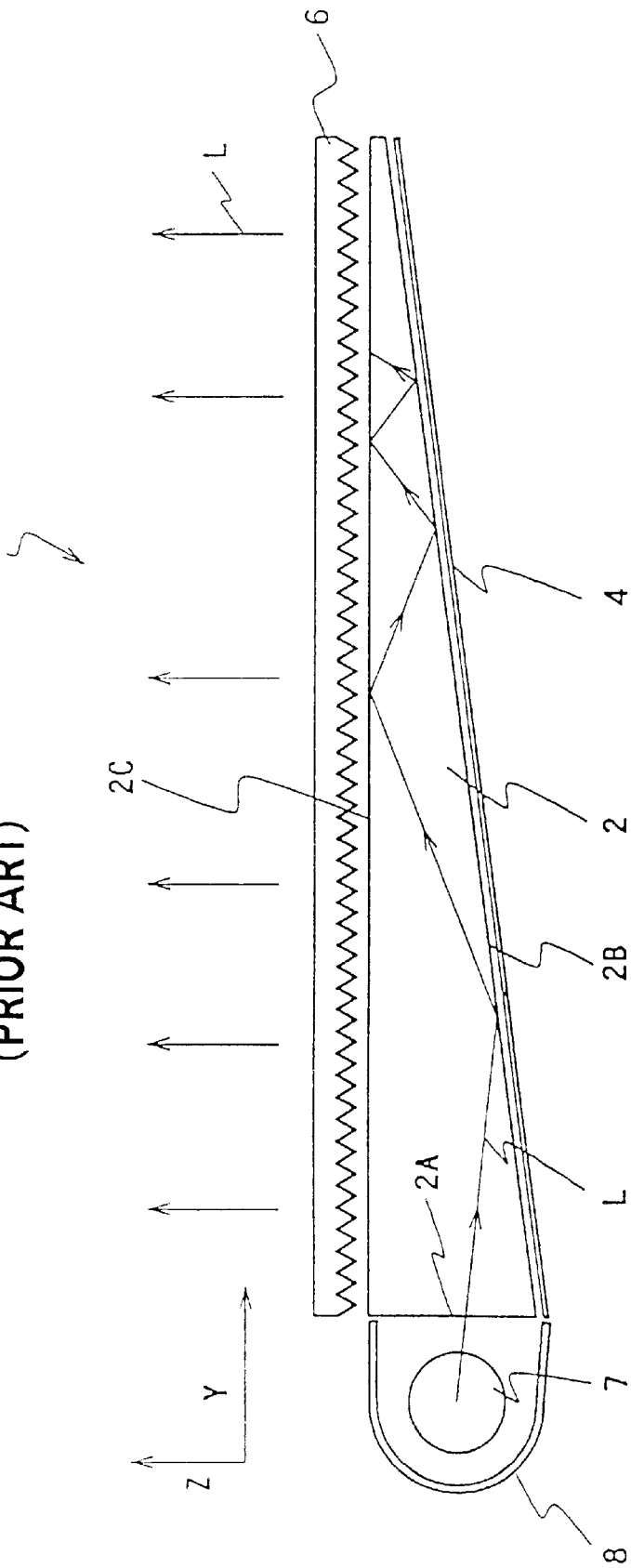
FIG. 12 a cross section along line 12—12 in FIG. 11.

A great number of projection rows are formed on the back face 22B of the scattering guide plate 22 (FIG. 10C). Each projection row includes a pair of slopes 22E, 22F and runs generally at right angles with respect to the incidence face 22A (within a range of 90±about 15 degrees). These projection rows correct directivity of emission from the scattering guide plate 22 so as to increase brightness viewed from the frontal direction regarding in a plane parallel to the incidence face 22A. In the illustrated case, an individual pair of slopes 22E, 22F make a prismatic vertical angle of about 100 degrees. A preferable range of this prismatic vertical angle is from 50 to 100 degrees.

Emission from the emission face 22C impinges on the prism sheet 25. A great number of projection rows are formed on an inner surface of the prism sheet 25 (FIG. 10B). Each projection row includes a pair of slopes 25E, 25F and runs generally in line with the incidence face 22A (within a range of 0 to 15 degrees). These projection rows function so as to increase brightness viewed from the frontal direction in a plane perpendicular to the incidence face 22A. A preferable range of this prismatic vertical angle is from 30 to 70 degrees. The cross section of the respective projection rows may be modified depending on characteristics required and may have other shapes such as asymmetric shape.

Emission from the prism sheet 25 is supplied to the liquid crystal display panel 24 through the polarization separating element 23. Details of the polarization separating element 23 will be described later.

The liquid crystal display panel 24 is of a TFT liquid crystal display panel which employs a liquid crystal cell (e.g. twisted nematic cell: hereafter called simply "cell") and has a rectangular contour. Linear polarizers (hereafter called simply "polarizer(s)") are arranged at an incidence side of the cell and an emission side of the cell, respectively. Angle β1 indicated in FIG. 1A is defined as an angle which is made by one side of the cell and transmission polarization plane M11 of the polarizer arranged at the incidence side of the cell. In the illustrated case, angle β1 is set at 45 degrees. This prevents brightness, as viewed from the emission side of the cell, from changing unnaturally depending on observation angles.

The polarization separating element 23 has a function such that a polarization component directionally according to its transmission polarization plane M12 is transmitted while a polarization component directionally according to its reflection polarization plane, which is perpendicular to transmission polarization plane M12, is reflected. The polarization separating element 23 is a known element, for example, consisting of a multilayer film made of optical anisotropy materials which have different refractive indexes depending on ordinary ray and extraordinary ray. Needless to say, elements employable include one which is provided with a combination consisting of a cholesteric liquid crystal layer and a quarter wavelength plate.

Orientation of transmission polarization plane M12 is set to accord directionally with transmission polarization plane M11 of the liquid crystal display panel 24 (incidence side polarizer). Therefore, the polarization component directionally in accordance with transmission polarization plane M12 is able to transmit through the polarization separating element 23. Almost all of thus transmitted light transmits through the polarizer arranged at the incidence side of the liquid crystal display panel 24 to contribute to displaying.

On the other hand, polarization component directionally in accordance with reflection the polarization plane M2, which is perpendicular to transmission polarization plane M12, is reflected by the polarization separating element 23. This is called "returning light", which returns toward the guide plate 22.

For the sale of convenient later description, "first running direction" is defined as a running direction of the projection rows (slopes 22E, 22F) on the back face 22B of the guide plate 22. And, "second running direction" is defined as a running direction of the projection rows (slopes 25E, 25F) on the inner surface of the prism sheet 25.

According to a feature of the present invention, the first running direction is neither corresponding nor vertical to transmission polarization plane M12. In other words, the first running direction is corresponding to neither to transmission polarization plane M12 nor to reflection polarization plane M2. Transmission polarization plane M12 and reflection polarization plane M2 may be orientated so that the first running direction gives an approximate bisect of an angle between transmission polarization plane M12 and reflection polarization plane M2.

Since the first running direction is generally perpendicular to the incidence face 22A, transmission polarization plane M12 and reflection polarization plane M2 are inclined, as shown in FIG. 1A, to the incidence face 22A, respectively.

It is to be noted that the first running direction does not necessarily give a bisect of an angle between transmission polarization plane M12 and reflection polarization plane M2. For instance, the first running direction may make angles within a range about 30 to about 60 degrees, respectively, with respect to planes M12 and M2 while the angles may be different from each other. However, from a standpoint of recycle efficiency, it is preferable that the first running direction give a bisect of an angle between plane M12 and plane M2.

The following will give an explanation of the reason why such relation between the first running direction and planes M12, M2 heightens recycle efficiency.

Returning light (reflection light by the polarization separating element 23) consists of a polarization component which is perpendicular to transmission polarization plane M12. Improved recycle efficiency will be realized when such polarization component of returning light, directionally corresponding to reflection polarization plane M2, is efficiently converted into a different polarization component which is directionally corresponding to transmission polarization plane M12.

Figure 2:
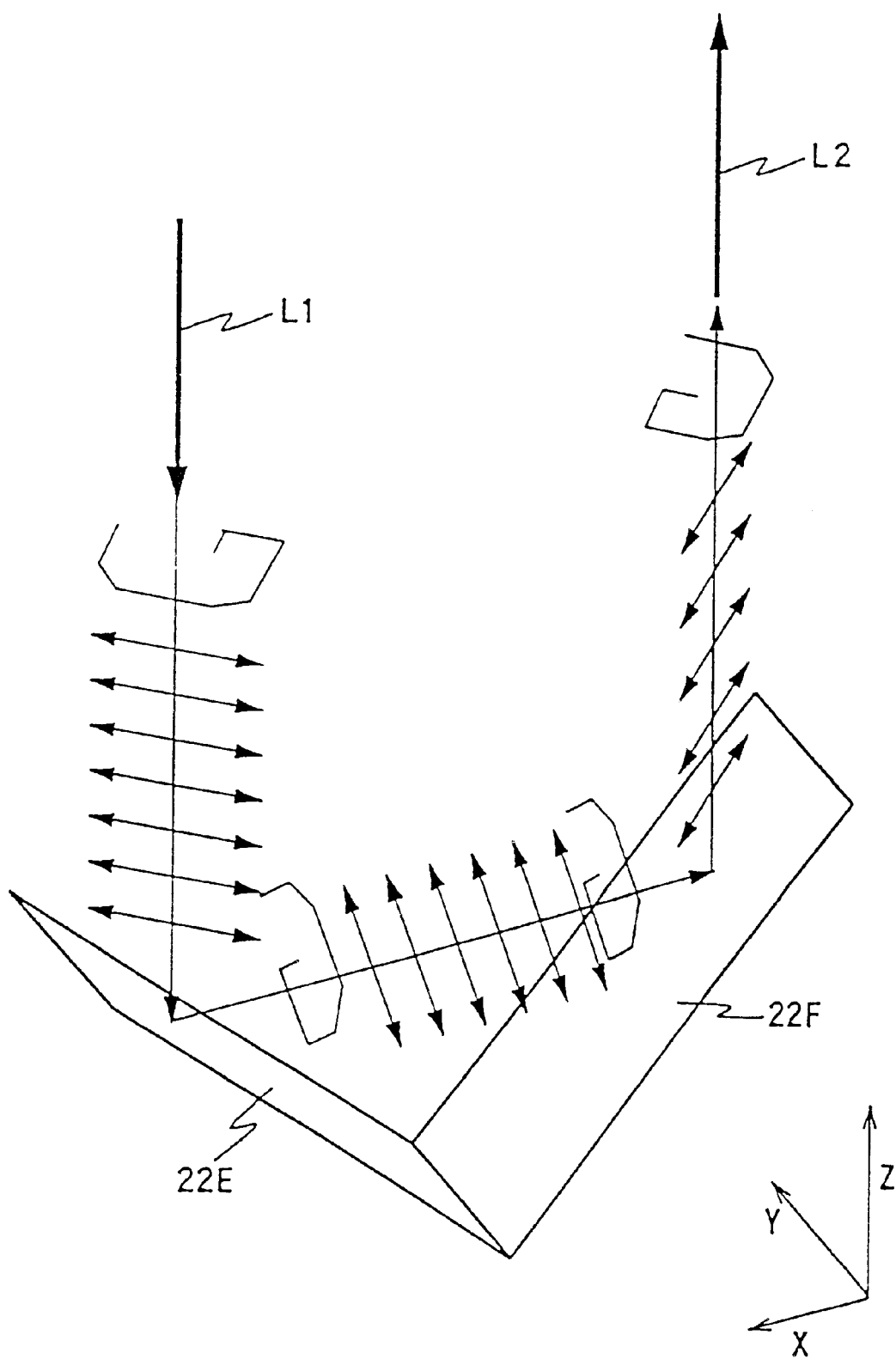
FIG. 2 is a diagram to illustrate polarization conversion by twice-reflection of returning light.
Figure 3:
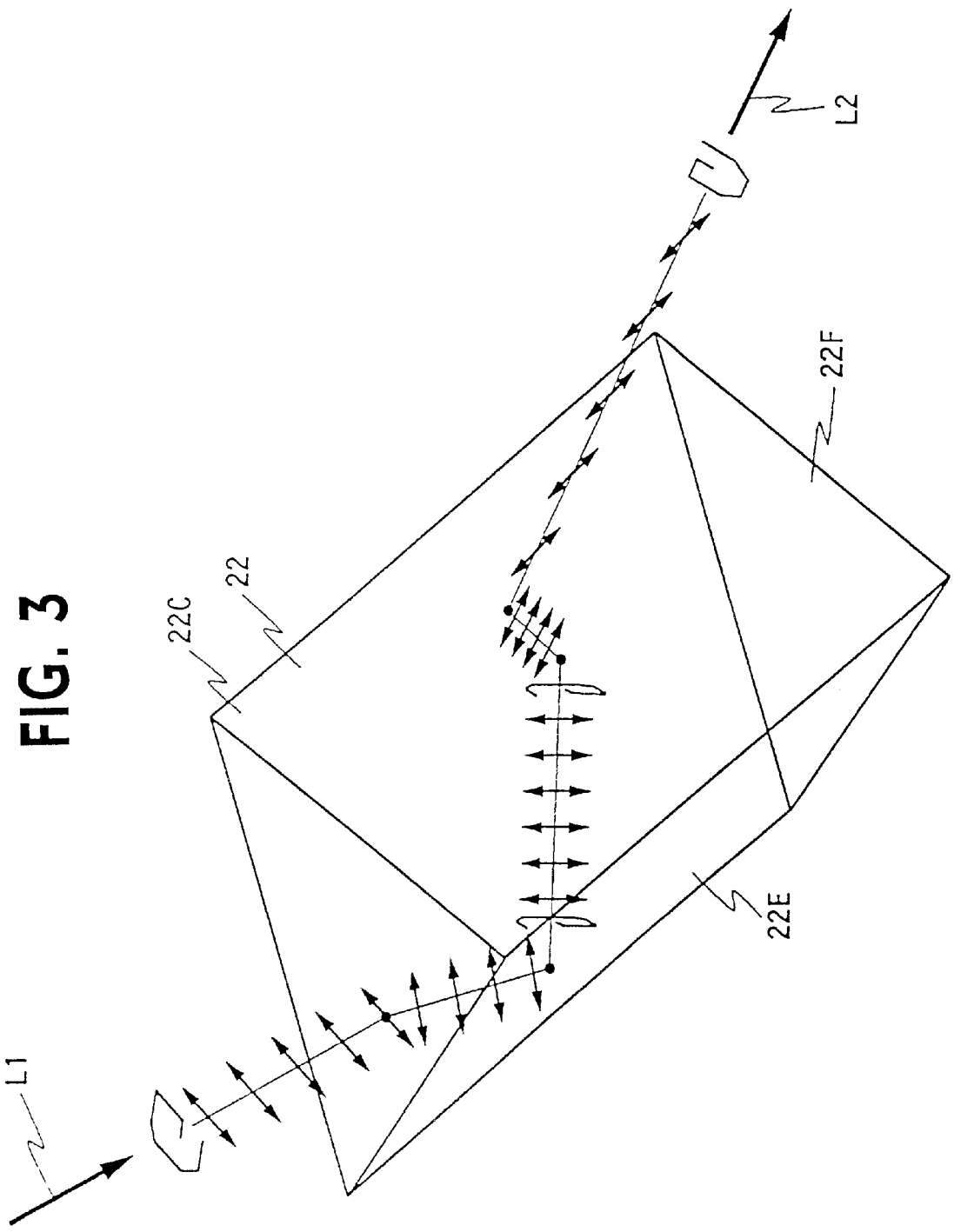
FIG. 3 is a diagram to illustrate polarization conversion by three-times-reflection of returning light.

The projection rows (22E, 22F) on the back face 22B of the guide plate 22 are capable of this conversion. FIGS. 2 and 3 give enlarged diagrams illustrating one of the projection rows on the back face of the guide plate 22. In FIG. 2, ray L1 represents component which is contained in returning light and impinges on the emission face 22C roughly at a right angle.

As shown in FIG. 2, ray L1 returns to the guide plate 22 via the prism sheet 25, then being subject to reflections by a pair of slopes 22E, 22F. As a result, ray L1 is emitted afresh from the emission face 22C as recycle ray L2.

The polarization axis of ray L1 is tilted through this reflection process to realize conversion of the polarization component. As indicated with a dual-directional arrow, the polarization axis of ray L1 crosses obliquely with the first running direction (running direction of the slopes 22E, 22F). This is because transmission polarization plane M12 and reflection polarization plane M2 of the polarization separating element 23 cross obliquely with the second running direction (running direction of the slopes 25E, 26F).

Successive reflections by the slopes 22E, 22F tilt the polarization axis of ray L1 as illustrated. The nearer totally produced difference in direction is, the higher expectant conversion efficiency is.

Thus polarization-converted recycle light impinges on the polarization separating element 23 again via the prism sheet 25. At this incidence, the polarization plane of ray L2 is such that the polarization component parallel to transmission polarization plane M12 has been enriched depending on the above difference in polarization axis direction. Needless to say, the thus produced polarization component transmits through the polarization separating element 23 and impinges on the liquid crystal display panel 24, thereby contributing to displaying.

Of course, recycle light contains an obliquely impinging component in addition to a vertically impinging component. Ray L1 shown in FIG. 3 represents a returning light component which impinges on the emission face 22C obliquely. This ray L1 impinges obliquely on the guide plate 22 via the prism sheet 25, then being subject to reflections by a pair of slopes 22E, 22F. As a result, ray L1 is emitted afresh from the emission face 22C as recycle ray L2.

Also in this case, as indicated with a dual-directional arrow, the polarization axis of ray L1 crosses obliquely with the first running direction (running direction of the slopes 22E, 22F). Successive reflections by the slopes 22E, 22F tilt polarization axis of ray L1 as illustrated. The nearer the totally produced difference in direction is, the higher expectant conversion efficiency is.

Thus polarization-converted recycle light impinges on the polarization separating element 23 again via the prism sheet 25. At this incidence, the polarization plane of ray L2 is such that the polarization component parallel to transmission polarization plane M12 has been enriched depending on the above difference in polarization axis direction.

The overall effect of polarization axis tilting (change of polarization plane direction) is influenced by inclination angles of the slopes 22E, 22F with respect to the emission face 22C. In general, large inclination angles (sharp prismatic vertical angle) tend to provide triple or more slope-reflections instead of the above-mentioned double slope-reflections. On the other hand, small inclination angles (dull prismatic vertical angle) tend to reduce such triple or more reflections. However, too small inclination angles tend to produce chances of single slope-reflection.

As aforementioned, a practical prismatic vertical angle is 100 degrees. And in general, the prismatic vertical angle falls preferably within a range from 50 to 130 degrees.

Figure 4:
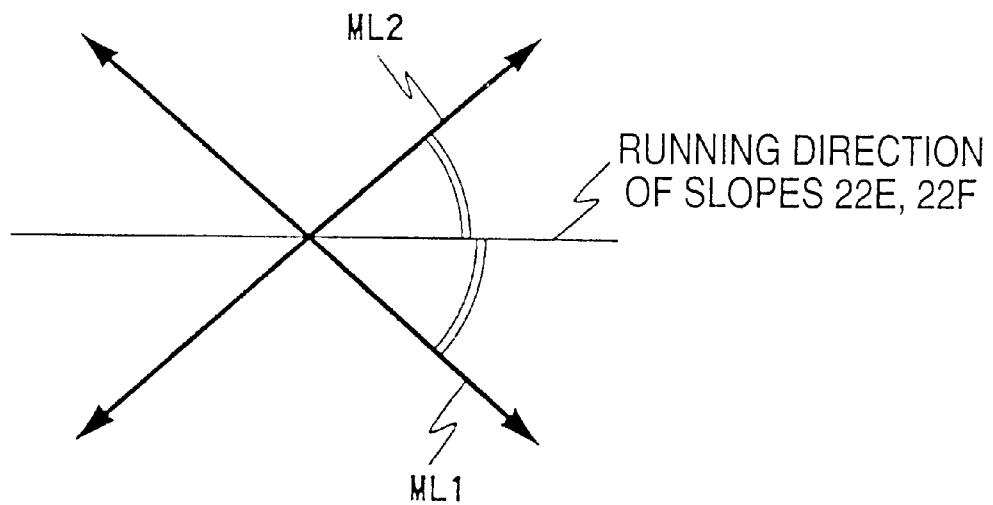
FIG. 4 is a diagram to illustrate changing of polarization plane caused by slope's reflection.

FIG. 4 illustrates how the polarization plane is changed through reflection by one slope 22E or 22F. In FIG. 4, ML1 represents a polarization plane direction of ray L1 before the slope-reflection. And ML2 represents a polarization plane direction of ray L2 after the slope-reflection by the slope 22E or 22F. As illustrated, changing of the polarization plane is caused so that polarization plane ML1 and polarization plane ML2 become symmetric with respect to running direction of the slopes 22E , 22F (the first running direction) which provides an axis of symmetry.

In this embodiment, the bisect of an angle between transmission polarization plane M12 and reflection polarization plane M2 of polarization separating element, 23 is directionally corresponding to running direction of the slopes 22E, 22F (the first running direction). Under this condition, ML1 and ML2 make approximately right angles to each other. Accordingly, recycle operation involving efficient polarization conversion is realized.

As described above, a basic feature of the present invention is that the transmission polarization plane and the reflection polarization plane of the polarization separating element is set so as to cross obliquely, respectively, with the running direction of the slopes on the back face of the guide plate (the first running direction).

According to a prior art, a polarization separating element is arranged outside of a surface light source device shown in FIG. 11. However, the back face 2B of the guide plate 2 is not provided with projection rows. Therefore, returning light will change so as to have a property of near-natural light through reflection and refraction by the emission face 2C, the back face 2B and so forth.

Accordingly, an assumed ratio of the polarization component directionally corresponding to the transmission polarization plane of the polarization separating element is around 50%. Although recycle efficiency can exceed 50% owing to multiplicity involved in the recycle process, it is doubtlessly inferior to that of the present invention. This is because the present invention is able to generate positively a polarization component which is directionally corresponding to transmission polarization plane M12 of the polarization separating element 23 by means of the above-described art, instead of natural light production on the basis of a neutral scrambling effect.

Figure 5:
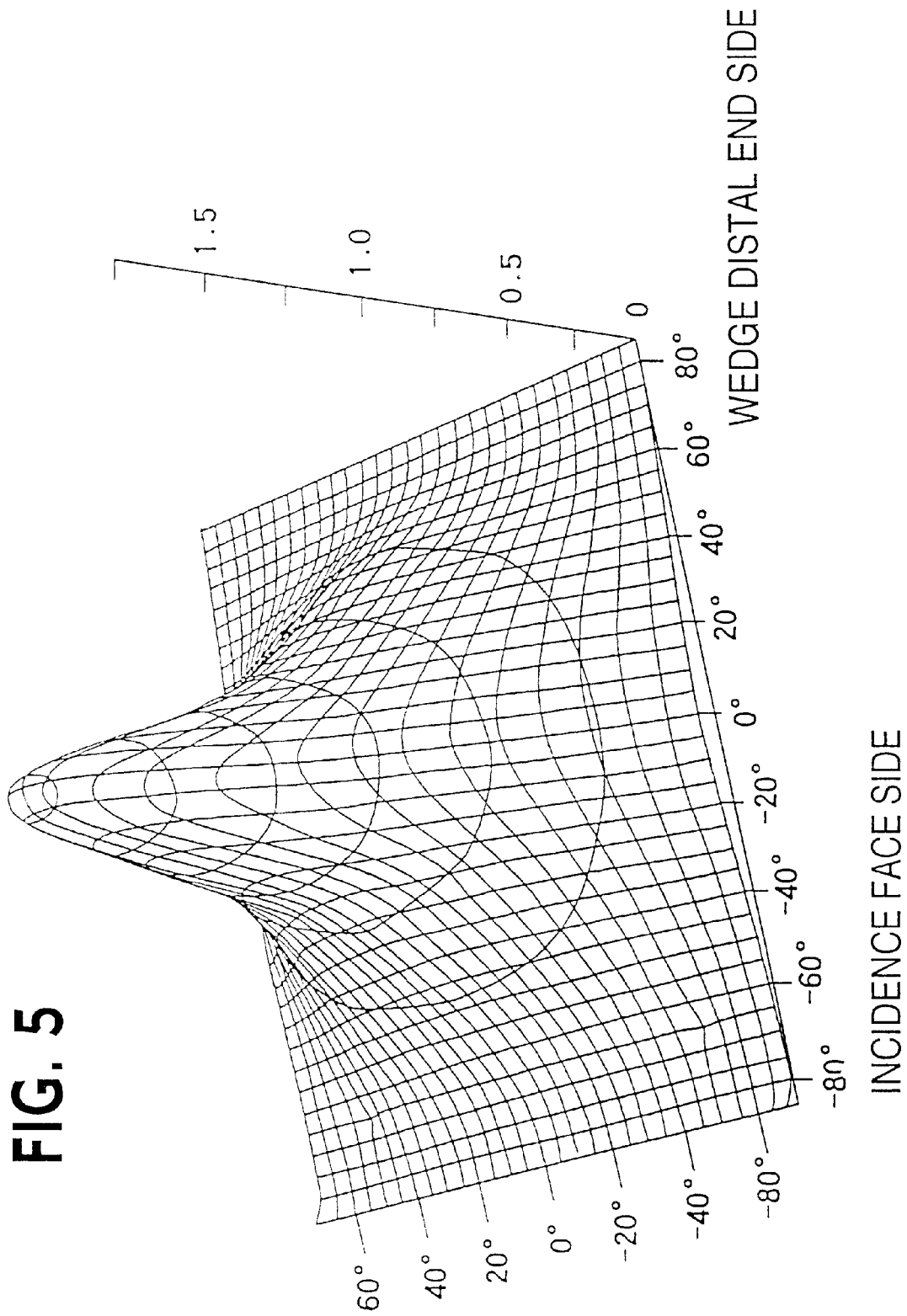
FIG. 5 is a graph illustrating directional luminance characteristics (measurement result) of the first embodiment.
Figure 6:
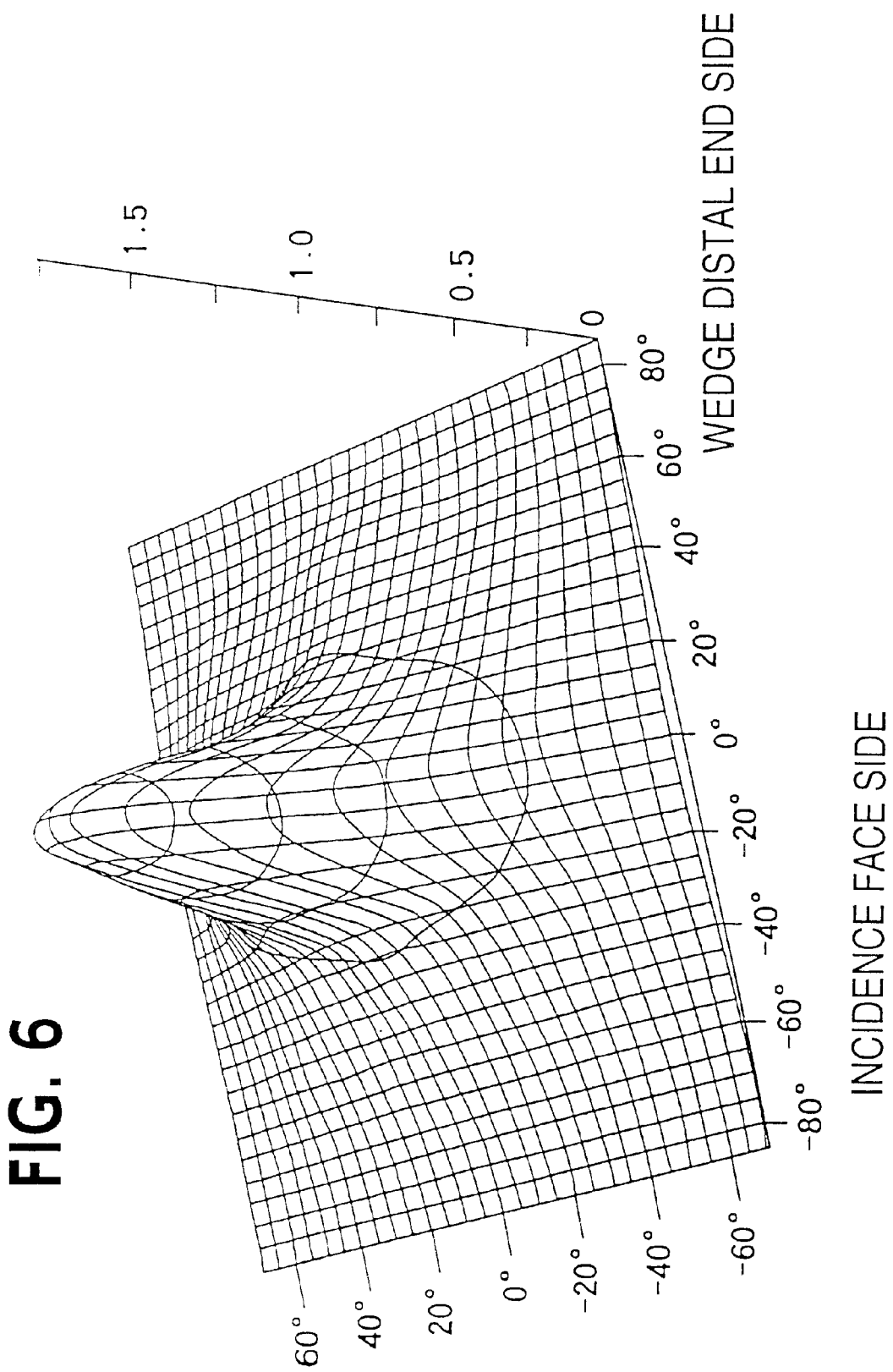
FIG. 6 is a graph illustrating directional luminance characteristics (measurement result) of an arrangement such that the employed polarization separating element is removed from the first embodiment.

FIG. 5 is a graph illustrating directional luminance characteristics (measurement result) of the liquid crystal display of the first embodiment. And FIG. 6 is a graph, for comparison, illustrating directional luminance characteristics (measurement result) of an arrangement such that the polarization separating element 23 is removed from the same liquid crystal display. Manners of illustration are common to those of FIGS. 16 to 18. It is to be noted that luminance curves are plotted under normalization in FIG. 15.

Figure 15:
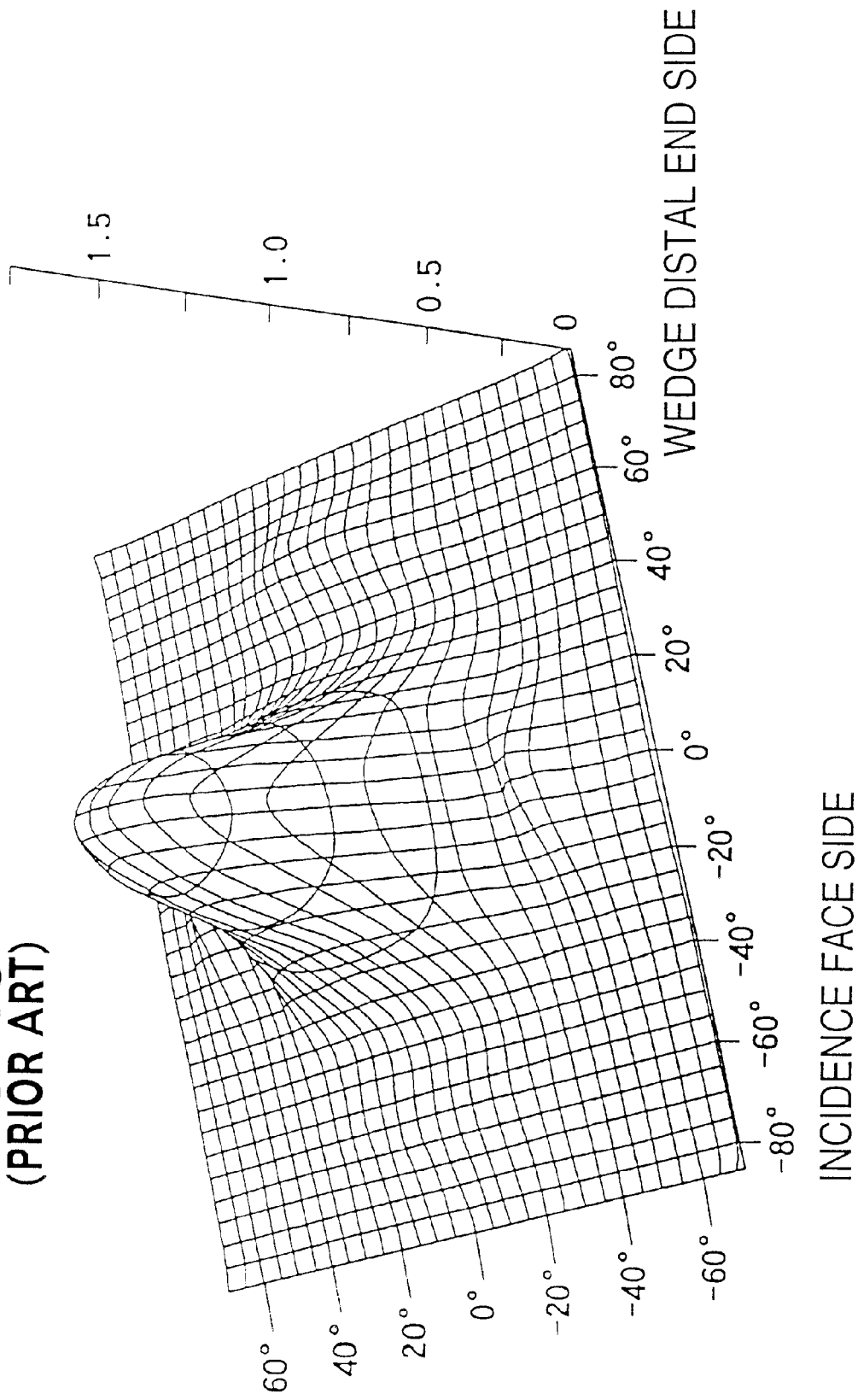
FIG. 15 is a graph illustrating directional luminance characteristics (measurement result) of an arrangement in which a liquid crystal display panel is backed by a surface light source device as shown in FIG. 13.
Figure 16:
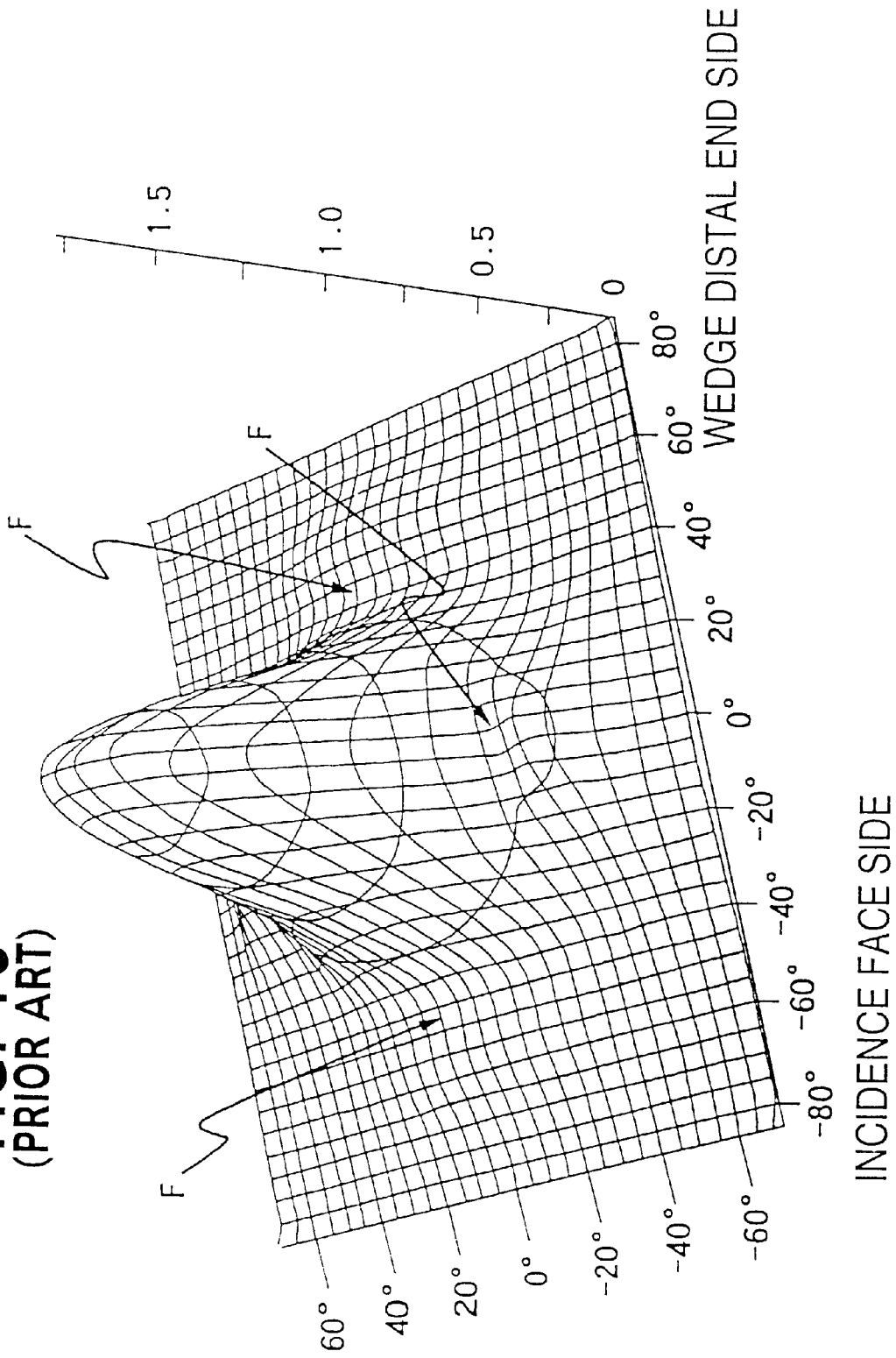
FIG. 16 is a graph illustrating directional luminance characteristics (measurement result) of an arrangement such that a polarization separating element is added to the arrangement under which the graph of FIG. 15 was plotted.
Figure 17:
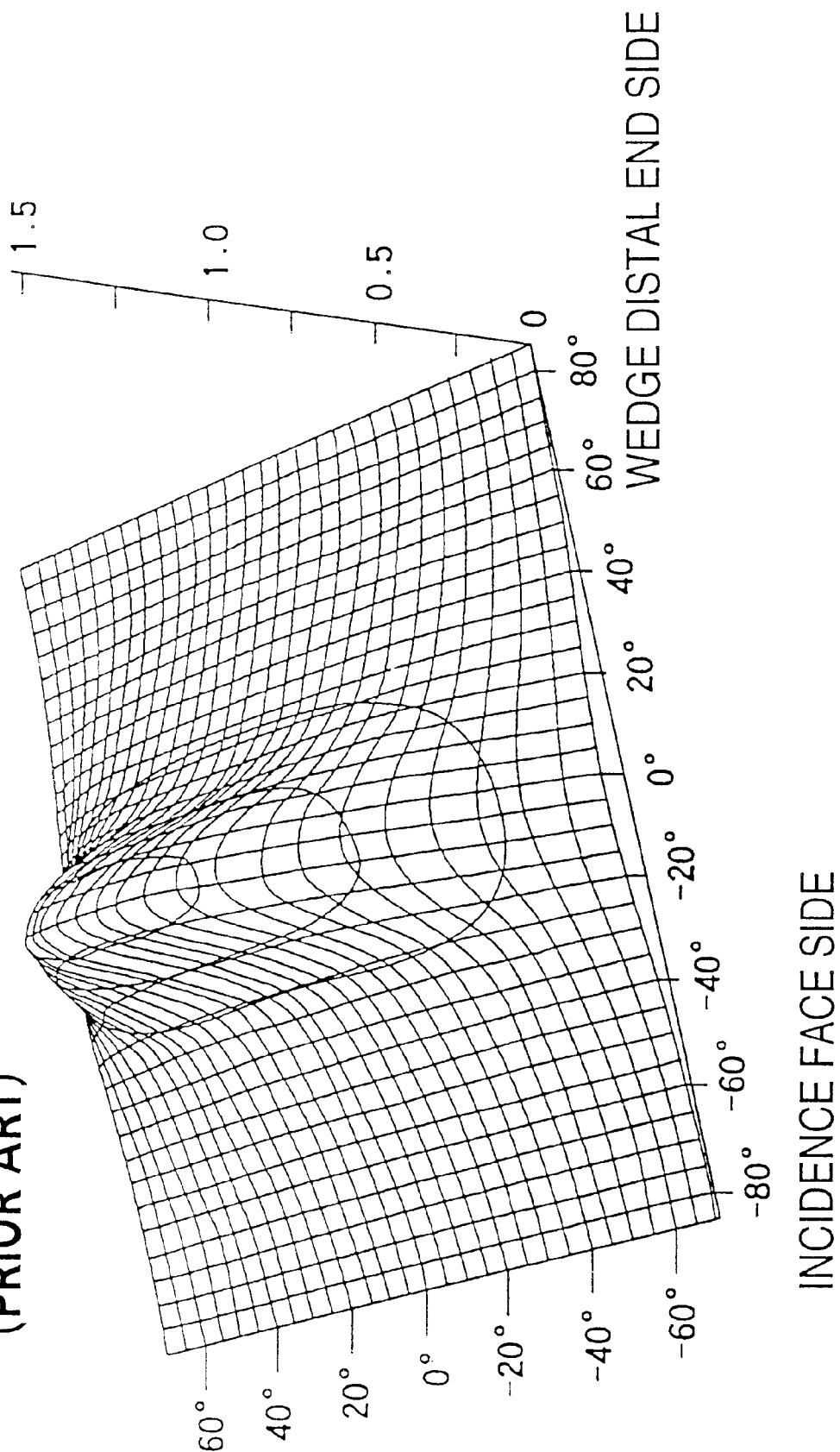
FIG. 17 is graph illustrating directional luminance characteristics (measurement result) of an arrangement in which a liquid crystal display panel is backed by a surface light source device as shown in FIG. 11; and, FIG. 18 is a graph illustrating directional luminance characteristics (measurement result) of an arrangement such that a polarization separating element is added to the arrangement under which the graph of FIG. 17 was plotted.

Comparing the graph of FIG. 5 with those of FIGS. 15, 16 and 6, a striking improvement of brightness level is seen in the present embodiment. That is, the graph of FIG. 5 has luminance curves shaping a hill greater than the other graphs. Preferential emission toward the frontal direction is maintained well.

Figure 1B:
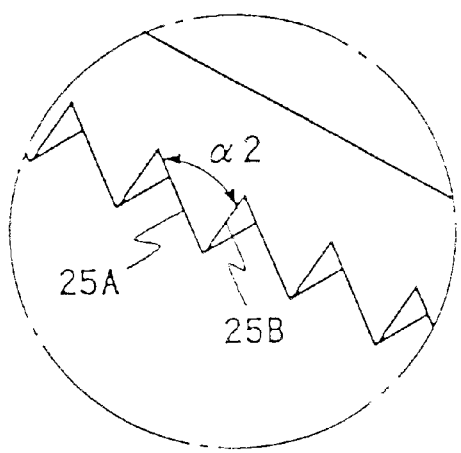
FIG. 1B is a an enlarged view of a side of a prism sheet shown in FIG. 1A.
Figure 1C:
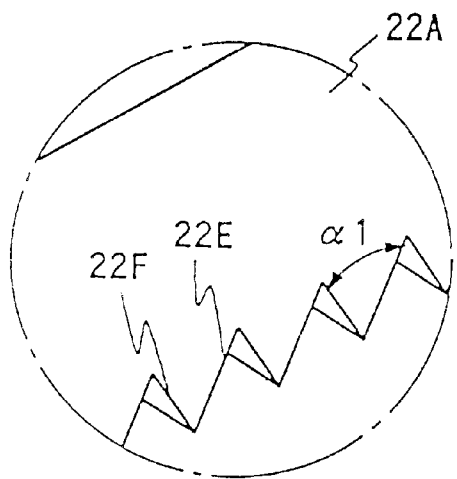
FIG. 1C is an enlarged view of a side end face of a guide plate shown in FIG. 1A.
Figure 18:
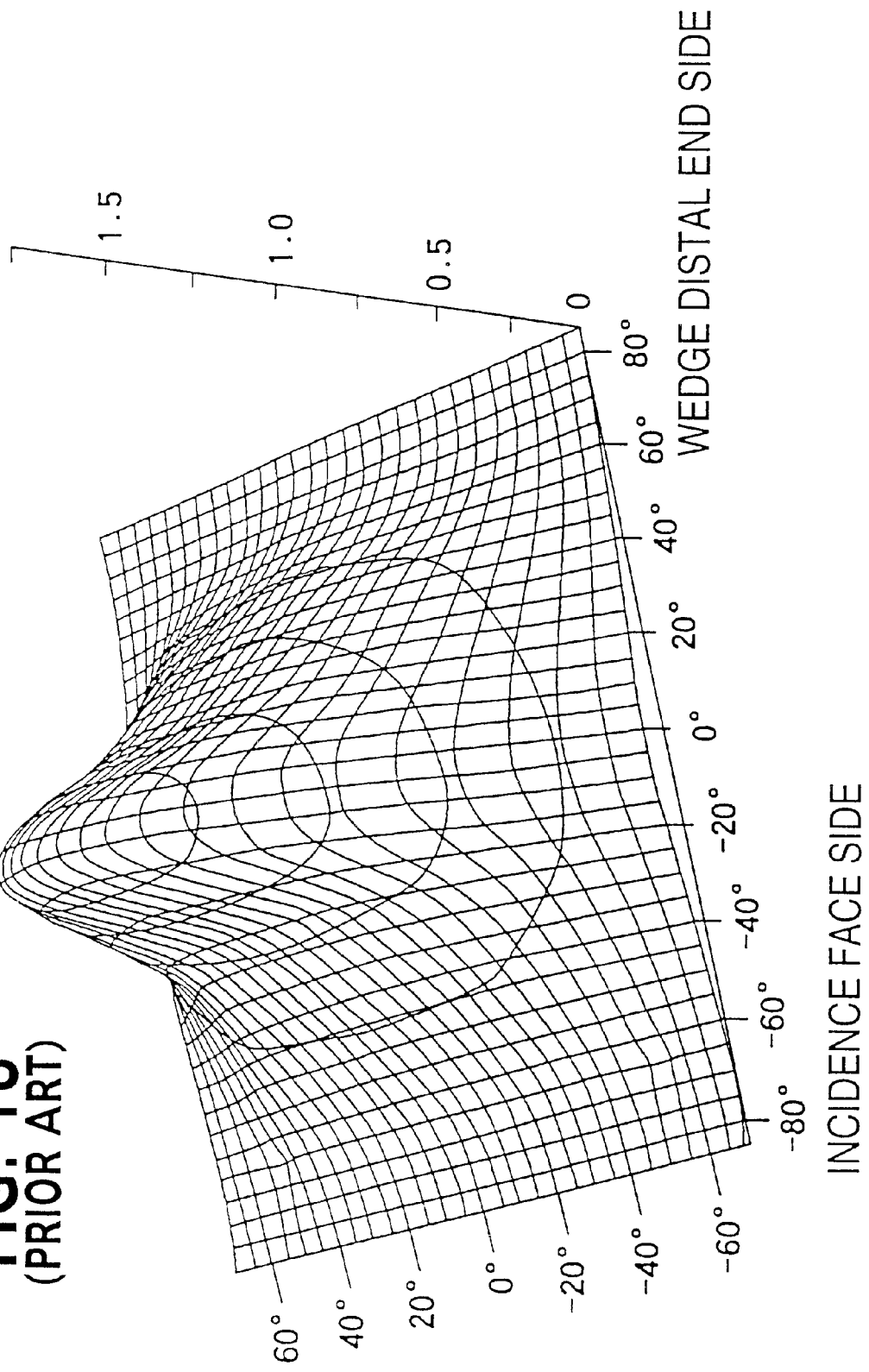

Although the luminance curves in FIGS. 16 and 18 are plotted under a condition such that a polarization separating element is arranged, they shape hills smaller compared with the graph of FIG. 5. Peaks of the curves score 1.247 in FIG. 16 and 1.001 in the graph of FIG. 18, as previously mentioned. On the other hand, peak value of the graph in FIG. 5 is 1.550. Such differences are assumed to be owing to the features of the present invention.

Incidentally, the total emission (integrated value of luminance) from the liquid crystal display panel 24 increased as much as about 70% compared with the case of FIG. 6 where the polarization separating element is removed.

Figure 7:
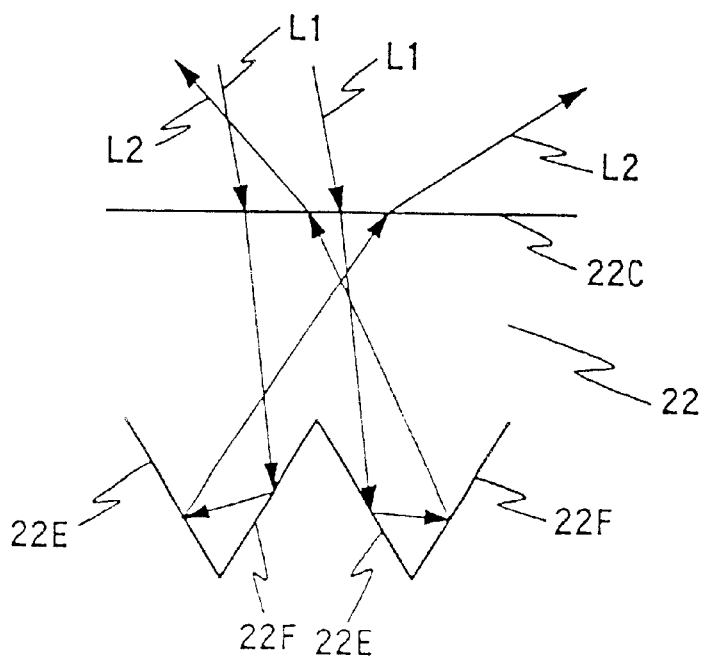
FIG. 7 is a diagram to illustrate behaviour of returning light.
Figure 8:
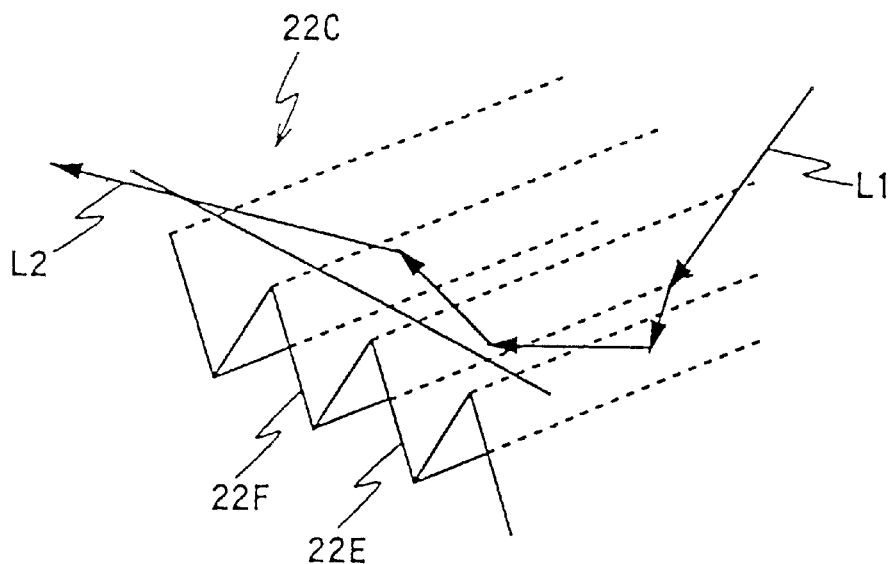
FIG. 8 is a perspective illustration corresponding to FIG. 7.

Referring now to FIGS. 7 and 8, the following will give a supplementary explanation of behaviour (change of proceeding direction) of returning light. FIG. 7 gives an illustration of a cross section parallel to the incidence face 22A. And FIG. 8 is a perspective illustration corresponding to FIG. 7.

As previously mentioned, directivity of emission has been corrected already toward the frontal direction regarding in a plane parallel to the incidence face 22A due to directivity correction operation of the projection rows on the back face 22B at the initial outputting from the emission face 22C.

Hence, principle of considered, it is understood that returning light contains much component which impinges on the emission face 22C at a small angle regarding in a plane parallel to the incidence face 22A.

Some of such impinging component is emitted from the emission face 22C, after being reflected by slopes 22E and 22F, with a larger angle compared with at impinging. This reduces sharpness of directivity to a certain extent, providing a somewhat widened viewing angular range. In other words, if an observation point is moved so as to deviate from the frontal direction of the liquid crystal display panel 24, only a gentle reduction in brightness of the display screen will be recognized.

It is to be noted that the prism sheet 25 employed in the present embodiment has a prismatic surface directed to the guide plate 22. This offers an advantage from a standpoint of avoidance of local reduction in brightness. If a prism sheet with a prismatic surface directed outward is employed alternately, a local brightness reduction area will emerge, as indicated by arrow F in FIG. 16.

Figure 9:
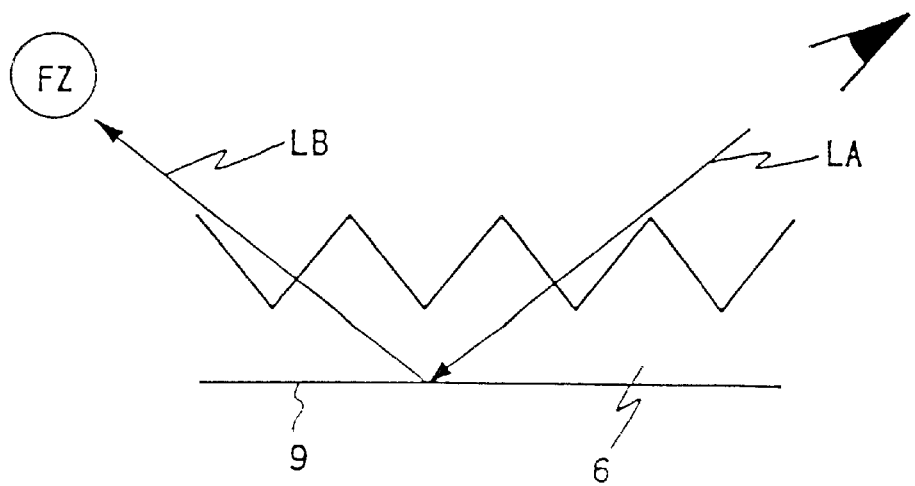
FIG. 9 is a cross section to illustrate influence of a prism sheet on directivity.

FIG. 9 is a diagram to give an explanation of the reason for this. FIG. 9 illustrates a cross section (perpendicular to the incidence face 22A) of a prism sheet having projection rows on the outer side, wherein a pair of slopes give, as an example, an angle (vertical angle) of 90 degrees. In this case, it is only such light as has undergone total-reflection by the inside surface (even surface 9) of the prism sheet that is observable from a direction inclined 45 degrees with respect to a normal line.

Accordingly, the observer is able to observe theorically only such light as coming from a direction indicated with FZ. However, as a matter of fact, no light source exists in direction FZ (outer direction with respect to the prism sheet), and consequently no light comes from direction FZ. After all, the observer is allowed to observe insufficient light from around the direction inclined 45 degrees and the emission face looks dark. The present embodiment is free from such situation.

(2) Second Embodiment

Referring to FIG. 10A, FIG. 10B and FIG. 10C a liquid crystal display 30 of the second embodiment in accordance with the present invention is shown in an illustration manner similar to FIG. 1A. Elements common to FIG. 1A are identified by common reference symbols.

The second embodiment is different from the first embodiment in that a surface light source device 31 arranged for backlighting employs a composite function element 32. The the following description of this embodiment is centered on the difference, with repeated explanations being omitted.

The composite function element 32 is a sheet-like member which functions both as a light control member and a polarization separating member. That is, the composite function element 32 is employed as a substitute for both the prism sheet 25 and the polarization separating member 23 which are employed in the first embodiment.

The composite function element 32 may be produced by glueing to unify a prism sheet and a polarization separating element with an optical adhesive. Orientation is set so that a prismatic surface is directed to the guide plate 22. This setting is common to that of the prism sheet 25 in the first embodiment.

The guide plate 22 is the same as in the first embodiment. A great number of projection rows (slopes 22E, 22F)which run in a first running direction (generally vertical to the incidence face 22A) are formed on the back face 22B.

The composite function element 32 comprises a polarization separating portion provided with a transmission polarization plane and a reflection polarization plane which are the same as those of the polarization separating element 23. And the projection rows (slopes 32A, 32B) of the prismatic surface run in a direction the same as afore said second running direction.

It will be easily understood by taking the aforementioned explanation of the first embodiment into account that the composite function element 32 arranged under such condition is capable of performing functions which are generally equivalent to those of the polarization separating element 23 and the prism sheet 25 employed in the first embodiment.

It should be noted that returning light is generated inside (at a conjunction face) of the composite function element 32. Such returning light returns to the guide plate 22 and is followed by polarization conversion as aforementioned, with the result that efficient recycle light production is realized to contribute to displaying.

Besides, the present embodiment has another advantage. That is, overall construction can be simplified because unifying of prism sheet and polarization separating element is adopted.

(3) Modifications

None of the above first and second embodiments are intended to limit the scope of the present invention. For instance, the following modifications are allowed.

(a) Unified construction of the composite element in the second embodiment may be produced by other means as follows.

EXAMPLE 1

A polarization separating element is prepared as a base material. Setting resin such as UV-setting resin is applied to one or both faces of the base material. A prismatic surface is formed by the use of setting with ultra-violet ray irradiation or the like.

EXAMPLE 2

Heating is applied to a polarization separating element to cause one or both faces thereof to be transformed so that a prismatic surface is formed thereon.

EXAMPLE 3

A prism sheet is prepared as a base material. Thin films are laminated and/or pressed against the base material to unify the prism sheet with the polarization separating element.

(b) Cross sections of the respective projection rows on the back face of the guide plate and of the prism sheet may be substituted by other shapes. For instance, a pair of slopes may be connected by a curved surface to form a projection. Otherwise, a pair of slopes, which form a projection, themselves may be a curved surface.

(c) Other additional elements such as light diffusion sheet may be interposed between the guide plate and the liquid crystal display panel. Diffusion power may be given to the emission face and/or the back face of the prism sheet and/or the guide plate, for example, by mat-processing.

However, if such diffusion power is given by such means is too strong, polarization planes of returning light are scrambled to become like natural light. This reduces recycle efficiency. Accordingly, it is preferable to adjust the degree of diffusion power in designing.

(d) Limitation is imposed on neither materials nor production methods of the prism sheet. For instance, light permeable materials such as polycarbonate (PC) or polymethyl methacrylate (PMMA) may be employed. A sheet-like or plate-like light control member without flexibility may be employed instead of a light control member made of resin material provided with flexibility.

(e) In the above embodiments, a white PET sheet is employed as a reflection sheet disposed along the back face of the guide plate. However, this is not limitative for the scope of the present invention. For instance, a reflection sheet evaporation-deposited metal such as Ag or Al may be employed as a sheet material with high reflectivity. Otherwise, metal such as Al may be fixed on the back face of the guide plate 22 by means of evaporation-deposition or the like. In this case, the back face itself provide a reflection surface.

(f) In the above-described embodiments, a scattering guide plate containing light permeable fine particles inside is employed. However, different sorts of scattering guide plates may be employed. Otherwise, a transparent scattering guide plate may be employed.

(g) A guide plate with a cross section other than wedge-shaped may be employed. For instance, a guide plate having uniform thickness is employable.

(h) Incidence faces of a guide plate may be set at two or more side end faces. A plurality of primary light sources may be arranged accordingly.

(i) A primary light source provided with a light source element other than rod-shaped ones such as a fluorescent lamp. For instance, a plurality of point-like light source elements such as LEDs may be arranged to provide a primary light source.

(j) The above embodiments employ liquid crystal display panels which are of a type such that a TN liquid crystal cell is incorporated. However, this does not limit for the scope of the present invention. For instance, the present invention is applicable to liquid crystal displays employing liquid crystal, display panels in which are incorporated liquid crystal cells of other types.

What is claimed is:

1. A surface light source device of the side light type comprising:

a guide plate having an emission faces a back face and a side end face;

a primary light source which supplies illumination light to said side end face of said guide plate; and a polarization separating element arranged in a light path of emission from said emission face, which element selectively transmits light in a first polarization plane and selectively reflects light in a second polarization plane;

said back face being provided with a great number of projection rows which run parallel with each other and in a first direction, said first direction neither being parallel with said first polarization plane nor vertical with respect to said first polarization plane, whereby said projection rows receive light reflected by said polarization separating element to produce a recyclic light that is directed to said emission face and is rich in light polarized in said first polarization plane to allow said recyclic light to transmit through said polarization separating element.

2. A surface light source of side light type as claimed in claim 1, wherein said first direction is oriented at an approximate bisect to an angle between said first polarization plane and said second polarization plane.

3. A surface light source device of side light type as claimed in claims 1 or 2, wherein said first direction is generally vertical with respect to said side end face.

4. A surface light source device of side light type as claimed in claims 1 or 2, further comprising:
   a light control member arranged between said emission face and said polarization separating element, said light control member being provided with a great number of projection rows which run parallel with each other and in a second direction vertical with respect to said first direction.

5. A surface light source device of side light type as claimed in claims 1 or 2, further comprising:
   a light control member arranged between said emission face and said polarization separating element, said light control member being provided with a great number of projection rows which run parallel with each other,
   wherein each projection row on said back face includes a pair of slopes making an angle within a range from 50 to 130 degrees and each projection row of said light control member includes a pair of slopes making an angle within a range from 30 to 70 degrees.

6. A surface light source device of side light type as claimed in claims 1 or 2, further comprising a reflection surface arranged along said back face.

7. A liquid crystal display comprising:
   a liquid crystal display panel; and
   a surface light source device of side light type arranged behind said liquid crystal display panel, said surface light source further comprising:
      a guide plate having an emission faces a back face and a side end face;
      a primary light source which supplies illumination light to said side end face of said guide plate; and
      a polarization separating element arranged in a light path of emission from said emission face, which element selectively transmits light in a first polarization plane and selectively reflects light in a second polarization plane;
      said back face being provided with a great number of projection rows which run parallel with each other and in a first direction, said first direction neither being parallel with said first polarization plane nor vertical with respect to said first polarization plane, whereby said projection rows receive light reflected by said polarization separating element to produce a recyclic light that is directed to said emission face and is rich in light polarized in said first polarization plane to allow said recyclic light to transmit through said polarization separating element.

8. A liquid crystal display as claimed in claim 7, wherein said first direction is oriented at an approximate bisect of an angle between said transmission polarization plane and said reflection polarization plane.

9. A liquid crystal display as claimed in claim 7 or 8, wherein said first direction is generally vertical with respect to said side end face.

10. A liquid crystal display as claimed in claim 7 or 8, further comprising a light control member arranged between said emission face and said polarization separating element,
    said light control member being provided with a great number of projection rows which run parallel with each other and in a second direction vertical with respect to said first direction.

11. A liquid crystal display as claimed in claim 7 or 8, further comprising a light control member arranged between said emission face and said polarization separating element said light control member being provided with a great number of projection rows which run parallel with each other, wherein each projection row on said back face includes a pair of slopes making an angle within a range from 50 to 130 degrees and each projection row of said light control member includes a pair of slopes making an angle within a range from 30 to 70 degrees.

12. A liquid crystal display as claimed in claim 7 or 8, further comprising a reflection surface arranged along said back face.

13. A surface light source device of the side light type, comprising:
    a primary light source which supplies illumination light;
    a guide plate having an emission face, a side end face, which receives said illumination light, and a back face, said back face being provided with a first great number of prismatic rows arranged parallel with each other, each said row having a first running direction of about 75 to 105 degrees with respect to said side end face; and
    a light control plate arranged in a light path of emission from said emission face, said light control plate having an inner face adjacent said emission face and a front face, said inner face being provided with a second great number of prismatic rows which run at an angle of about 0 to 15 degrees with respect to the side end face, said front face being provided with a light polarization surface having a polarization transmission plane arranged at an angle of about 30 to 60 degrees with respect to the first running direction.

* * * * *

UNITED STATES PATENT AND TRADEMARK OFFICE
CERTIFICATE OF CORRECTION

PATENT NO. : 6,384,881 B1
DATED : May 7, 2002
INVENTOR(S) : Takayuki Arai et al.

It is certified that error appears in the above-identified patent and that said Letters Patent is hereby corrected as shown below:

Column 3,
Line 29, insert -- , -- after "supplied".

Column 6,
Line 32, delete ",".

Figure 13:
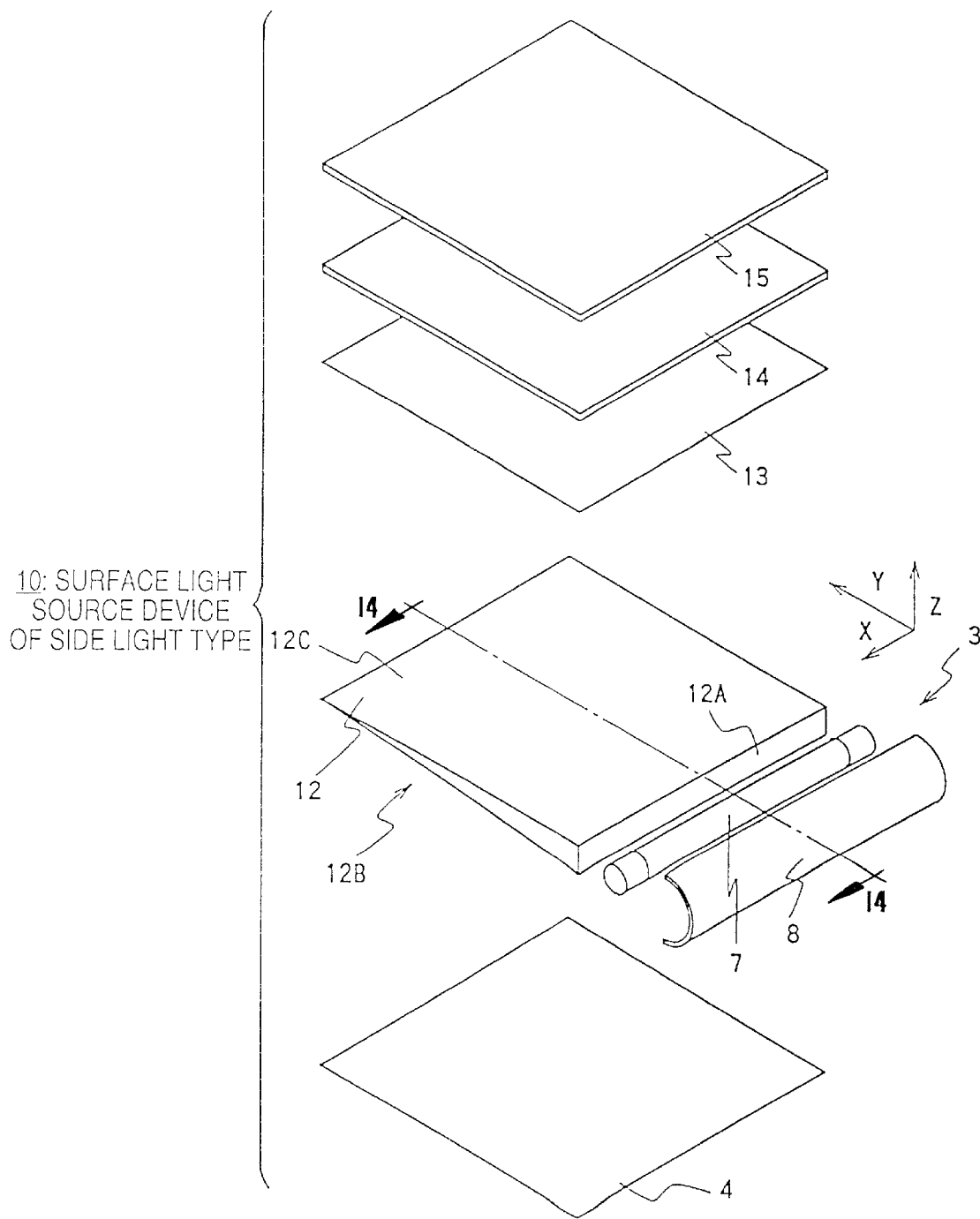
FIG. 13 is an exploded perspective view illustrating another conventional surface light source device of side light type.
Figure 14:
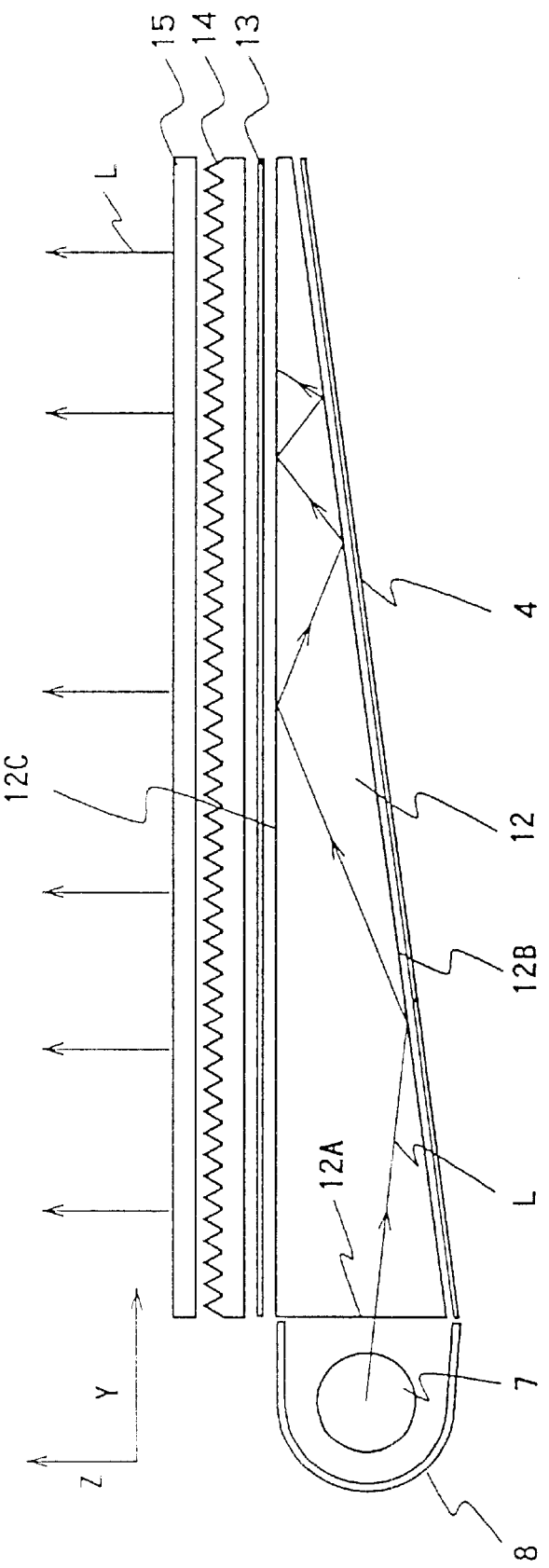
FIG. 14 a cross section along line B—B in FIG. 11.

Column 7,
Line 17, change "B-B in Fig. 11" to -- 14-14 in Fig. 13 --.

Column 9,
Line 3, insert -- the -- after "of"
Line 6, insert -- the -- before "polarization".

Column 11,
Line 1, delete ",".

Column 12,
Line 6, insert -- reversibility -- after "of"
Line 56, delete "the".

Column1 5,
Line 42, change "faces" to -- face, --.

Column 16,
Line 23, insert -- , -- after "element".

Signed and Sealed this

Eighteenth Day of June, 2002

Attest:

JAMES E. ROGAN
*Attesting Officer*     *Director of the United States Patent and Trademark Office*